(12) United States Patent
Nakagawa et al.

(10) Patent No.: US 9,127,436 B2
(45) Date of Patent: Sep. 8, 2015

(54) WORKING VEHICLE ENGINE OUTPUT CONTROL SYSTEM AND METHOD

(75) Inventors: Tomohiro Nakagawa, Hirakata (JP);
 Shigeru Yamamoto, Hirakata (JP);
 Kenjiro Shimada, Komatsu (JP)

(73) Assignee: KOMATSU LTD., Tokyo (JP)

( * ) Notice: Subject to any disclaimer, the term of this patent is extended or adjusted under 35 U.S.C. 154(b) by 188 days.

(21) Appl. No.: 12/674,049

(22) PCT Filed: Oct. 9, 2008

(86) PCT No.: PCT/JP2008/068333
 § 371 (c)(1),
 (2), (4) Date: Feb. 18, 2010

(87) PCT Pub. No.: WO2009/054270
 PCT Pub. Date: Apr. 30, 2009

(65) Prior Publication Data
 US 2011/0040458 A1 Feb. 17, 2011

(30) Foreign Application Priority Data

Oct. 22, 2007 (JP) ................................ 2007-273719

(51) Int. Cl.
 *G06F 19/00* (2011.01)
 *E02F 9/20* (2006.01)
 (Continued)

(52) U.S. Cl.
 CPC .......... *E02F 9/2066* (2013.01); *B60W 30/1882* (2013.01); *B60W 30/1888* (2013.01);
 (Continued)

(58) Field of Classification Search
 USPC ............. 701/1, 50, 51, 54, 60, 61, 62, 84, 87, 701/90, 110, 58, 70, 82, 86, 99, 101, 103; 464/30
 See application file for complete search history.

(56) References Cited

U.S. PATENT DOCUMENTS 3,717,996 A * 2/1973 Ahlen .............................. 60/327
3,904,007 A * 9/1975 Braun et al. .................... 477/85
(Continued)

FOREIGN PATENT DOCUMENTS

JP  62-234741 A  10/1987
JP  63-19343 A  1/1988
(Continued)

OTHER PUBLICATIONS

Machine Translation of Minami dated Feb. 4, 2014 from http://www4.ipdl.inpit.go.jp/Tokujitu/tjsogodbenk.ipdl.*
(Continued)

*Primary Examiner* — John R Olszweski
*Assistant Examiner* — Jean-Paul Cass
(74) *Attorney, Agent, or Firm* — Global IP Counselors, LLP

(57) ABSTRACT

An engine output control system is for a work vehicle composed of an engine, a travel device and a power transmission unit, the power transmission unit including a torque converter and transmitting an output of the engine to the travel device via the torque converter. The engine output control system includes a speed ratio computation portion and an engine output reduction control portion. The speed ratio computation portion is configured and arranged to compute a speed ratio of the torque converter. The engine output reduction control portion is configured and arranged to reduce an output torque of the engine without changing a target speed of the engine when the computed speed ratio is equal to or less than a speed ratio threshold set in advance. The speed ratio threshold is a speed ratio at which a torque ratio of the torque converter is greater than a torque ratio corresponding to a maximum efficiency.

11 Claims, 6 Drawing Sheets

(51) Int. Cl.
*F02D 29/00* (2006.01)
*B60W 30/188* (2012.01)

(52) U.S. Cl.
CPC ........ *F02D29/00* (2013.01); *B60W 2510/0233* (2013.01); *B60W 2510/0275* (2013.01); *B60W 2710/0677* (2013.01); *B60Y 2200/25* (2013.01); *B60Y 2200/41* (2013.01); *B60Y 2400/426* (2013.01)

(56) References Cited

U.S. PATENT DOCUMENTS

| | | | | |
|---|---|---|---|---|
| 4,046,032 | A * | 9/1977 | Braun et al. | 477/122 |
| 4,890,681 | A * | 1/1990 | Skelly | 173/218 |
| 5,050,454 | A * | 9/1991 | Yamaguchi et al. | 477/109 |
| 5,124,922 | A * | 6/1992 | Akiyama | 701/85 |
| 5,224,457 | A * | 7/1993 | Arsenault et al. | 123/526 |
| 5,559,703 | A * | 9/1996 | Iwata et al. | 701/86 |
| 5,983,151 | A | 11/1999 | Okada et al. | |
| 7,337,054 | B2 * | 2/2008 | Pandey et al. | 701/82 |
| 7,945,378 | B2 * | 5/2011 | Sheidler et al. | 701/110 |
| 8,095,285 | B2 * | 1/2012 | Schifferer et al. | 701/54 |
| 2001/0008988 | A1 * | 7/2001 | Russell et al. | 701/54 |
| 2004/0116220 | A1 * | 6/2004 | Yamamoto et al. | 474/18 |
| 2005/0182544 | A1 * | 8/2005 | Preisner | 701/51 |
| 2007/0204605 | A1 | 9/2007 | Itoga et al. | |
| 2008/0227596 | A1 * | 9/2008 | Schifferer | 477/52 |
| 2010/0076662 | A1 * | 3/2010 | Sheidler et al. | 701/102 |

FOREIGN PATENT DOCUMENTS

| | | | |
|---|---|---|---|
| JP | 64-62525 | A | 3/1989 |
| JP | 01-178741 | A | 7/1989 |
| JP | 05-106239 | A | 4/1993 |
| JP | 08-151658 | A | 6/1996 |
| JP | 2001-295911 | A | 10/2001 |
| JP | 2006-22939 | A | 1/2006 |
| JP | 2006022939 | A * | 1/2006 |
| JP | 2006-169974 | A | 6/2006 |
| JP | 2006169974 | A * | 6/2006 |
| JP | 2013139717 | A * | 7/2013 |

OTHER PUBLICATIONS

English Translation of Notification of Reasons for Refusal of corresponding Japanese Application No. 2009-538066 dated Jan. 26, 2012.

Herbert L. Nichols, Jr. et al., "Moving the Earth," 4th edition, p. 15.1-15.9, The McGraw-Hill Companies, 1998, United States.

* cited by examiner

SPEED RANGE AND TRACTION FORCE
IN OCCURRENCE OF SHOE SLIPPAGE

WORKING VEHICLE ENGINE OUTPUT CONTROL SYSTEM AND METHOD

TECHNICAL FIELD

The present invention relates to an engine output control system and an engine output control method that are applied to a work vehicle provided with a work implement in which engine output is transmitted to a travel device via a torque converter.

BACKGROUND ART

The bulldozer includes a work implement, an engine, a torque converter, a travel device, and a power transmission unit. The power transmission unit is configured to transmit engine output to the travel device via the torque converter. The travel device is composed of crawler belts (see Herbert L. Nichols, Jr. et al., "MOVING THE EARTH," 4th edition, p 15.1-15.9, The McGraw-Hill Companies, 1998, United States).

The bulldozer excavates the ground while pushing soil with the work implement (e.g., blade). When a large load acts on the vehicle in the excavation work of the work implement, the torque converter enters a completely/nearly stalled state. The term "completely stalled state" refers to a state that a speed ratio of the torque converter is zero. On the other hand, the term "nearly stalled state" refers to a state that the speed ratio of the torque converter is roughly zero.

SUMMARY

When the torque converter is in the nearly/completely stalled state, a torque converter efficiency is reduced and the amount of heat generation of the torque converter is increased. Accordingly, a heat balance of the work vehicle gets worse and the work vehicle will be easily overheated. Consequently, some countermeasures (e.g., increase of the cooling device's size) are required.

When the torque converter is in the nearly/completely stalled state, a torque ratio is large and output of the torque converter is increased. Accordingly, input torque of the transmission is increased. In some cases, excessive torque may be inputted into the transmission. Consequently, some countermeasures (e.g., enhancement of the transmission's strength) are required.

Further, when the torque converter is in the completely stalled state, the crawler belts completely stop circulating. Output torque of the torque converter cannot be obtained as effective driving force in the crawler belts. In other words, a state is produced that the engine wastefully consumes fuel and work efficiency is bad.

The present invention is produced in view of the above actual cases. It is an object of the present invention to solve a problem to be caused when the torque converter of the work vehicle is in the nearly/completely stalled state.

A first aspect of the present invention relates to an engine output control system for a work vehicle composed of an engine, a travel device and a power transmission unit. The engine output control system includes speed ratio computation portion and engine output reduction control portion. The power transmission unit includes a torque converter and transmits an output of the engine to the travel device via the torque converter. The speed ratio computation portion is configured and arranged to compute a speed ratio of the torque converter. Additionally, a speed ratio, at which a torque ratio of the torque converter is greater than a torque ratio corresponding to a maximum efficiency, is set in advance to be a speed ratio threshold. The engine output reduction control portion is configured and arranged to reduce an output torque of the engine without changing a target speed of the engine when the computed speed ratio is equal to or less than the speed ratio threshold.

A second aspect of the present invention relates to the engine output control system for a work vehicle according to the first aspect. In this case, the travel device included in the work vehicle preferably includes crawler belts. Additionally, a speed ratio at which a shoe slippage occurs is set in advance as the speed ratio threshold.

A third aspect of the present invention relates to the engine output control system for a work vehicle according to the first aspect. In this case, the speed ratio threshold is preferably set in advance to a speed ratio at which a traction force of the work vehicle equals to 0.8×W where a weight of the work vehicle is defined as W.

A fourth aspect of the present invention relates to the engine output control system according to one of the first to third aspects. In this case, the speed ratio threshold is preferably set to be in a range of 0.5 to 0.6.

A fifth aspect of the present invention relates to an engine output control method for a work vehicle that an output of an engine is transmitted to a travel device via a torque converter. In this case, a speed ratio, at which a torque ratio of the torque converter is greater than a torque ratio corresponding to a maximum efficiency, is set in advance to be a speed ratio threshold.

The engine output control method for a work vehicle includes the steps of: computing the speed ratio of the torque converter; comparing a magnitude of the computed speed ratio and a magnitude of the speed ratio threshold; and reducing an output torque of the engine without changing a target speed of the engine when the computed speed ratio is equal to or less than the speed ratio threshold.

DESCRIPTION OF EMBODIMENTS

An embodiment of the present invention will be hereinafter explained with reference to figures.

Figure 1:
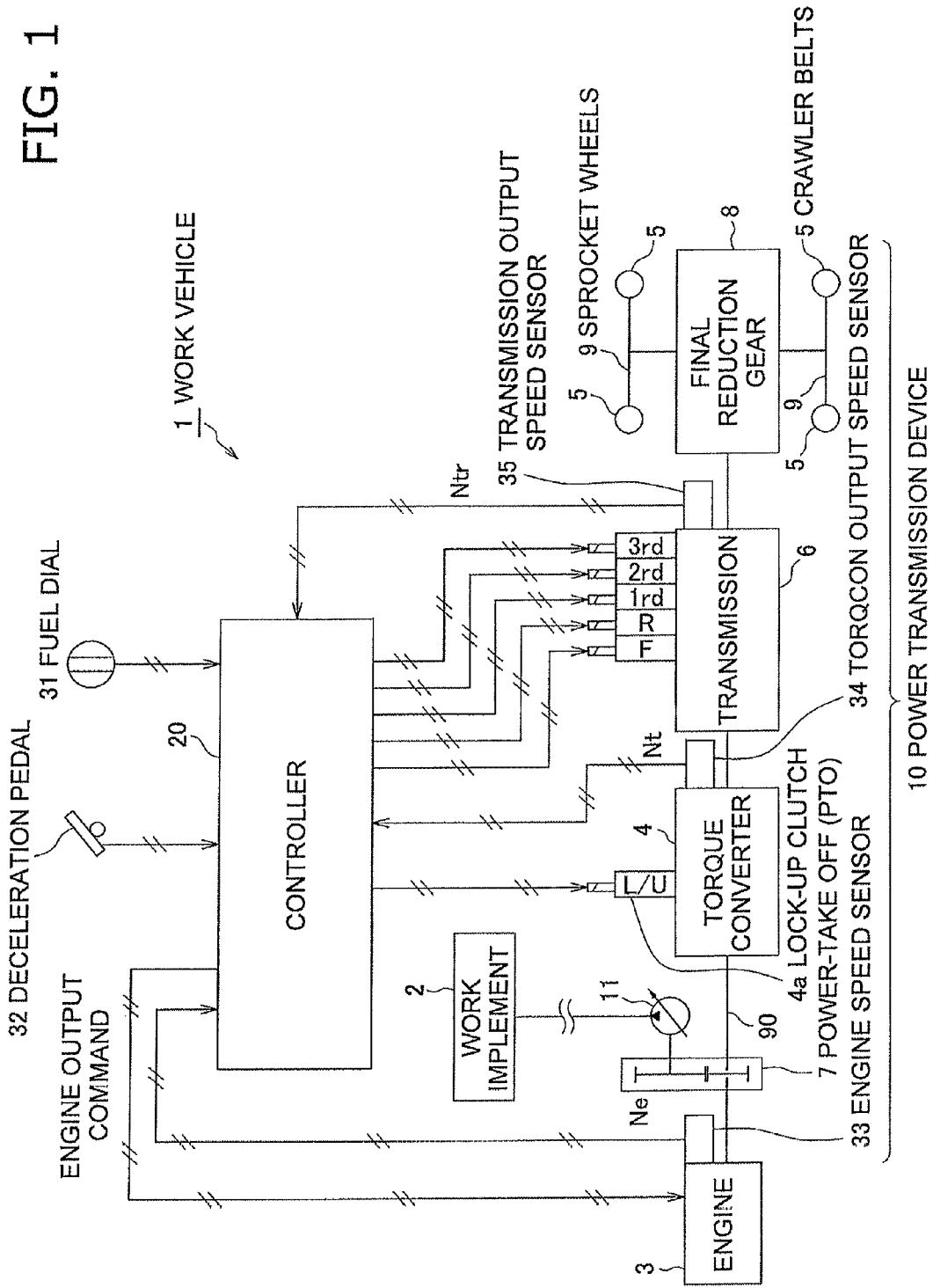
FIG. 1 is a block diagram for illustrating composition of an engine output control system of a work vehicle according to an embodiment, and also illustrates some components of bulldozer's composition that are related to the present invention.

FIG. 1 is a block diagram for illustrating composition of an engine output control system of a work vehicle 1 according to the present embodiment. FIG. 1 illustrates some components of bulldozer's composition that are related to the present invention.

As illustrated in FIG. 1, the system of the present embodiment is an engine output control system assumed to be used for the work vehicle 1. The work vehicle 1 is composed of a work implement 2 including a blade, an engine 3 made up of a diesel engine, a travel device 5 composed of a pair of crawler belts, and a power transmission unit 10. The power transmission unit 10 includes a torque converter 4 with a lock-up clutch. The power transmission unit 10 is configured to transmit output of the engine 3 to the travel device 5 via the torque converter 4.

As illustrated in FIG. 1, a driving force transmission path 90 ranges from the engine 3 of the work vehicle 1 to the crawler belts 5. In the driving force transmission path 90, a power take-off (PTO) 7, the torque converter 4 with a lock-up clutch, a transmission 6, a final reduction gear 8 and sprocket wheels 9. The transmission 6 is composed of a forward clutch F, a reverse clutch R, speed gear clutches $1^{st}$, $2^{nd}$ and $3^{rd}$. In the work vehicle 1, an output shaft of the engine 3 is coupled to the power take-off 7. The power take-off 7 is coupled to a pump and a lock-up clutch 4a of the torque converter 4 with a lock-up clutch. Further, the power take-off 7 is coupled to a hydraulic pump 11.

Output (torque) of the engine 3 is partially transmitted to the crawler belts 5 via the power take-off 7, either the lock-up clutch 4a or a pump and a turbine of the torque converter 4 with a lock-up clutch, the transmission 6, the final reduction gear 8, and the sprocket wheels 9. On the other hand, rest of the output of the engine 3 is transmitted to the hydraulic pump 11 via the power take-off 7. Accordingly, the hydraulic pump 11 is driven and discharges hydraulic oil. The discharged hydraulic oil is transferred to a hydraulic actuator (not illustrated in the figure) via a control valve (not illustrated in the figure). The work implement 2 is thus activated.

Engagement/disengagement actions of the lock-up clutch 4a and the clutches of the transmission 6 (i.e., the forward clutch F, the reverse clutch R, the speed gear clutches $1^{st}$, $2^{nd}$ and $3^{rd}$) are controlled by a controller 20. In the present embodiment, control of the engagement/disengagement actions will be explained not in a lock-up state but in a torque converter state. The lock-up state herein refers to a state that the lock-up clutch 4a performs an engagement action and the pump and the turbine of the torque converter 4 are coupled to each other. On the other hand, the torque converter state herein refers to a state that the lock-up clutch 4a performs a disengagement action and the pump and the turbine of the torque converter 4 are not coupled to each other.

A fuel dial 31 and a deceleration pedal 32 are disposed in an operator's cab of the work vehicle 1.

The fuel dial 31 is operated by an operator. A signal, indicating a target engine speed, is accordingly inputted into the controller 20. The target engine speed herein corresponds to the operating amount of the fuel dial 31. The deceleration pedal 32 is operated (i.e., pressed down) by the operator. A signal, indicating a deceleration speed, is accordingly inputted into the controller 20. The deceleration speed herein corresponds to the operating amount (i.e., pressed-down amount) of the deceleration pedal 32.

The engine 3 is provided with an engine speed sensor 33. The engine speed sensor 33 detects an actual speed Ne of the engine 3. A signal, indicating the speed Ne detected by the engine speed sensor 33, is inputted into the controller 20.

The output shaft of the torque converter 4 is provided with a torque converter output speed sensor 34. The torque converter output speed sensor 34 detects a speed Nt of the output shaft of the torque converter. A signal, indicating the speed Nt detected by the torque converter output speed sensor 34, is inputted into the controller 20. Instead of the torque converter output speed sensor 34, a transmission output speed sensor 35 may be provided to the output shaft of the transmission 6. In this case, a signal, indicating a speed Ntr of the output shaft of the transmission 6, may be configured to be inputted into the controller 20.

The controller 20 controls the engine 3 by transmitting an engine output command to the engine 3 in order to achieve the target speed corresponding to the operating amount of the fuel dial 31. The engine 3 is a diesel engine and the engine output is controlled by regulating the amount of fuel to be injected into a cylinder. The regulation is performed by controlling a governor attached to a fuel injection pump of the engine 3. An all-speed control governor is herein used as the governor of engine 3. The governor regulates the engine speed and the amount of fuel injection in accordance with a load in order to achieve the target speed corresponding to the operating amount of the fuel dial. In other words, the governor increases/decreases the amount of fuel injection for eliminating a difference between the target engine speed and the actual engine speed.

Furthermore, the controller 20 controls the speed Ne of the engine 3 in accordance with the operating amount (i.e., pressed-down amount) of the deceleration pedal 32 in order to reduce the speed Ne of the engine 3.

Figure 3:
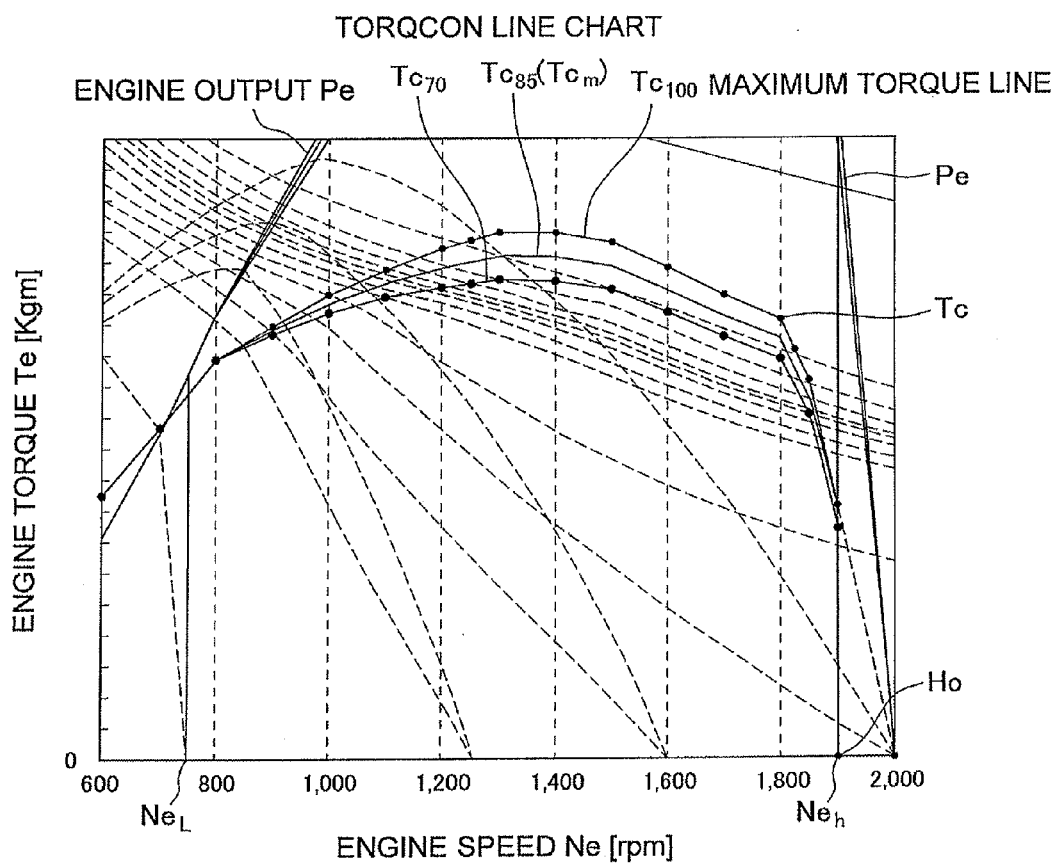
FIG. 3 is a torque converter line chart of an engine.

FIG. 3 is a torque line chart of the engine 3. In FIG. 3, the horizontal axis represents the engine speed Ne, whereas the vertical axis represents an engine torque Te.

In FIG. 3, a range, defined by a maximum torque line Tc100, indicates performance that is available for the engine 3. The governor controls the engine 3 for preventing the engine torque from exceeding the maximum torque line Tc100 and further exceeding a discharge limit. Additionally, the governor controls the engine 3 for preventing the engine speed Ne from exceeding a high idling-speed Neh and excessively revolving. Note "NeL" indicates a low idling-speed, and the discharge limit refers to a threshold that a discharge gas does not include black smoke.

When the controller 20 herein outputs an engine output command corresponding to 100% of the operating amount of the fuel dial, the target speed of the engine 3 is set to be a maximum target speed corresponding to a rated-value point. The governor performs speed regulation along the highest speed regulation line that connects a rated-value point Tc and a high-idle point Hp. A matching point between output torque from the engine 3 and absorption torque absorbed by the torque converter 4 and the hydraulic pump 11 moves on the maximum torque line Tel 00 in accordance with a load.

When a torque Te in a matching point on the maximum torque line Tc100 is defined as 100%, a torque Te on a torque line Tc70 corresponds to be 70%. Similarly, a torque line Tem is a torque line on which an available torque is greater than that on the torque line Tc70 but is less than that on the maximum torque line Tc100. For example, a torque line Tc85 is a torque line on which a torque Te corresponds to be 85%.

Figure 2:
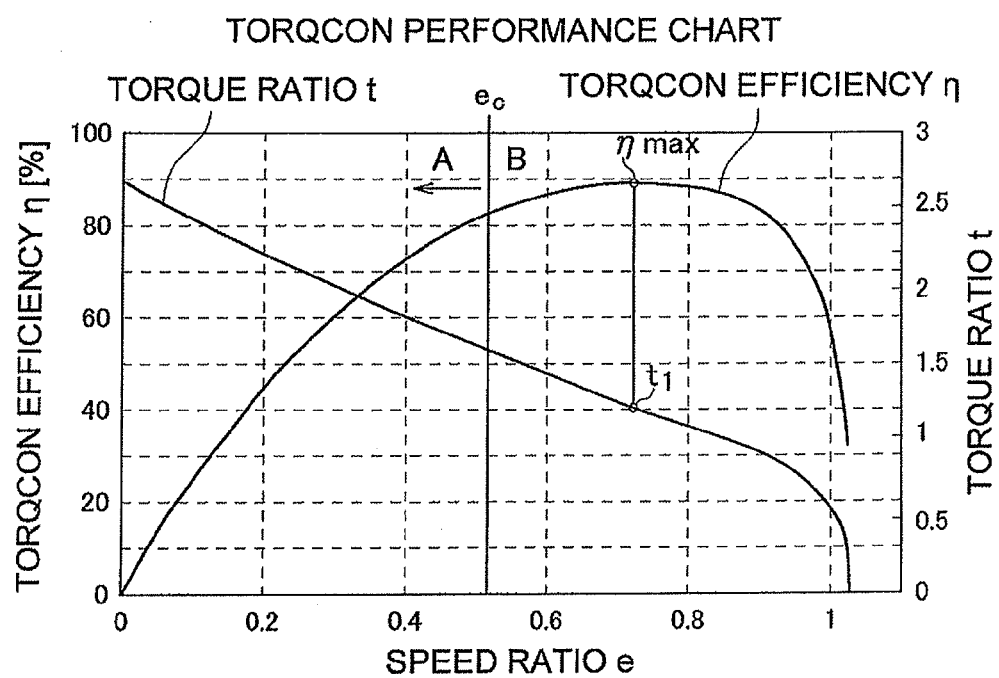
FIG. 2 is a torque converter performance chart.

FIG. 2 is a torque converter performance chart for showing performance of the torque converter 4. The horizontal axis of FIG. 2 indicates a speed ratio e, whereas the vertical axis thereof indicates an efficiency η of the torque converter 4 and a torque ratio t of the torque converter 4. The speed ratio e is herein a ratio of the output speed Nt of the torque converter 4 to the input speed Ne of the torque converter 4. The speed ratio e can be obtained by the following expression (1).

$$e = Nt/Ne \quad (1)$$

The speed ratio e can also be obtained by the following expression (2) with the input speed Ne of the torque converter 4 and the output shaft speed Ntr of transmission 6 where a reduction ratio of the transmission 6 is defined as k.

$$e = k \times Ntr/Ne \quad (2)$$

The torque ratio t is a ratio of an output torque Tt of the torque converter 4 to the input torque Te of the torque converter 4. The torque ratio t can be obtained by the following expression (3).

$$t = Tt/Te \qquad (3)$$

The efficiency η of the torque converter 4 (torque converter efficiency) is a ratio of an output horsepower Pt of the torque converter 4 to an input horsepower Pe of the torque converter 4. The efficiency η can be obtained by the following expression (4).

$$\eta = Pt/Pe = Tt \times Nt/Te \times Ne = e \times t \qquad (4)$$

Figure 4:
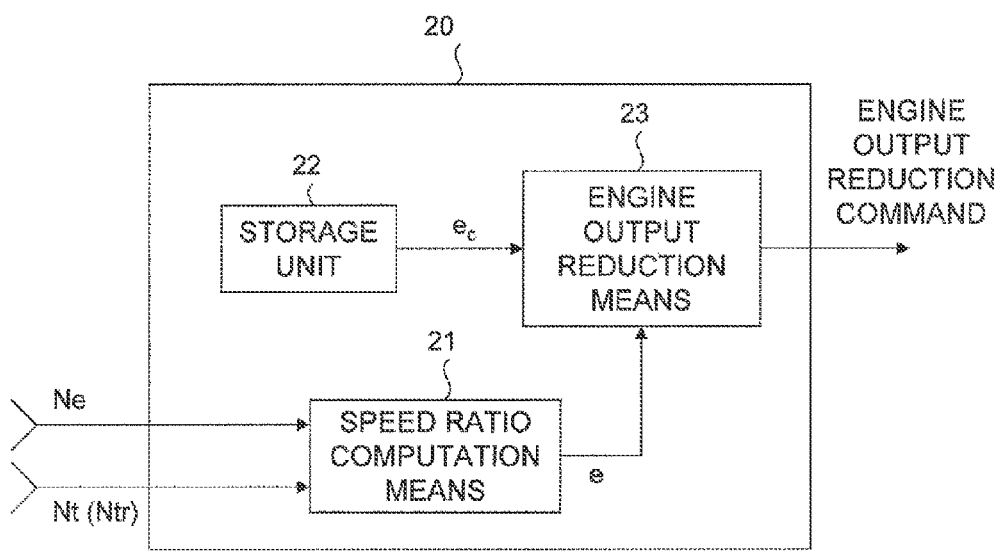
FIG. 4 is a block diagram for illustrating some components of controller's internal composition that are related to the present invention.

FIG. 4 is a block diagram for illustrating some components of the internal composition of the controller 20 that are related to the present invention.

The controller 20 includes speed ratio computation portion 21, a storage unit 22 and engine output reduction portion 23.

The storage unit 22 of the controller 20 stores performance characteristics peculiar to the torque converter 4, which are illustrated in FIG. 2. In short, the storage unit 22 of the controller 20 stores data maps of (1) the relation of the torque converter efficiency with respect to the speed ratio and (2) the relation of the torque ratio to the speed ratio. The storage unit 22 stores a speed ratio threshold ec, which is set in advance. The speed ratio threshold ec is a speed ratio at which the torque ratio t of the torque converter 4 is greater than a torque ratio t1 corresponding to a maximum efficiency η max.

The speed ratio computation portion 21 computes the speed ratio e of the torque converter 4 in accordance with the aforementioned expression (1) or (2).

The engine output reduction portion 23 performs a control for reducing output Pe from the engine 3 when the computed speed ratio e is equal to or less than the speed ratio threshold ec. The control for reducing engine output is performed by regulating the fuel injection amount without changing the engine speed Ne. Therefore, reduction in engine output herein means reduction in the engine torque Te.

Figure 5:
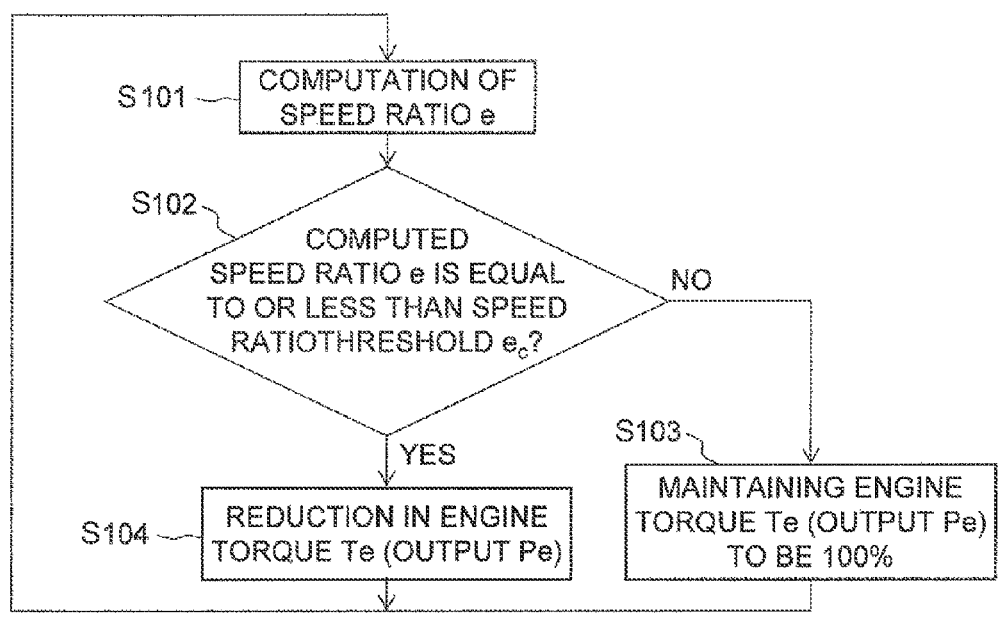
FIG. 5 is a flowchart for showing contents of processing to be executed in the controller of the embodiment.

FIG. 5 is a flowchart for illustrating a control processing procedure of the present embodiment, which is executed by the controller 20.

In short, the speed ratio e is obtained through the computation based on the aforementioned expression (1) using the speed Ne detected by the engine speed sensor 33 and the speed Nt detected by the torque converter output speed sensor 34. Alternatively, the speed ratio e is obtained through the computation based on the aforementioned expression (2) using the speed Ne detected by the engine speed sensor 33 and the speed Ntr detected by the transmission output speed sensor 35 (Step S101).

Next, comparison is performed between magnitude of the computed speed ratio e and magnitude of the speed ratio threshold ec stored in the storage unit 22. In other words, it is determined whether or not the computed speed ratio e is equal to or less than the speed ratio threshold ec (Step S102).

When the determination results in that the computed speed ratio e is greater than the speed ratio threshold ec (No in determination of Step S102), the controller 20 controls the engine 3 by transmitting an engine output command to the engine 3 in order to achieve a target speed corresponding to the operating amount of the fuel dial 31. In the engine torque line chart illustrated in FIG. 3, a torque line of the engine 3 is accordingly maintained as the maximum torque line Tc100 on which the 100% torque Te can be generated. The torque value is thus maintained to be 100%. In other words, a matching point between the output torque of the engine 3 and the absorption torque of the torque converter 4 and the hydraulic pump 11 moves on the maximum torque line Tc100 in accordance with a load (Step S103).

On the other hand, when the computed speed ratio e is equal to or less than the speed ratio threshold ec (Yes in determination of Step S102), the controller 20 transmits an engine output reduction command to the engine 3 for selecting the torque line Tc70 regardless of the operating amount of the fuel dial 31. In the engine torque line chart illustrated in FIG. 3, the torque line of the engine 3 is accordingly shifted down from the maximum torque line Tc100 on which the 100% torque Te can be generated to the torque line Tc70 on which the 70% torque Te can be generated. The torque Te of the engine 3 is thus reduced to the 70% torque value, and the engine output Pe is accordingly reduced (Step S104).

In the aforementioned control example, the output Pe (torque Te) of the engine 3 is configured to be reduced to a predetermined value in a single stage when the computed speed ratio e is equal to or less than the speed ratio threshold ec. However, the output Pe (torque Te) of the engine 3 may be reduced in two or more stages. For example, when the computed speed ratio e is equal to or less than the speed ratio threshold ec and furthermore a small difference is obtained between the computed speed ratio e and the speed ratio threshold ec, the torque line of the engine 3 is shifted down from the maximum torque line Tc100 on which the 100% torque Te can be generated to the torque line Tc85 on which the 85% torque Te can be generated as illustrated in the engine performance chart of FIG. 3. The torque Te of the engine 3 is thus reduced to the 85% torque value. Furthermore, when a difference between the computed speed ratio e and the speed ratio threshold ec is greater than the aforementioned small difference, the torque line of the engine 3 is shifted down to the torque line Tc70 on which the 70% torque Te can be generated in the engine torque line chart illustrated in FIG. 3. Consequently, it is possible to implement reduction in the torque value down to 70%.

Further, in the aforementioned control example, the output Pe (torque Te) of the engine 3 is configured to be intermittently reduced in a single or plurality of stages when the computed speed ratio e is equal to or less than the speed ratio threshold ec. However, the output Pe (torque Te) of the engine 3 may be configured to be continuously reduced.

Figure 6:
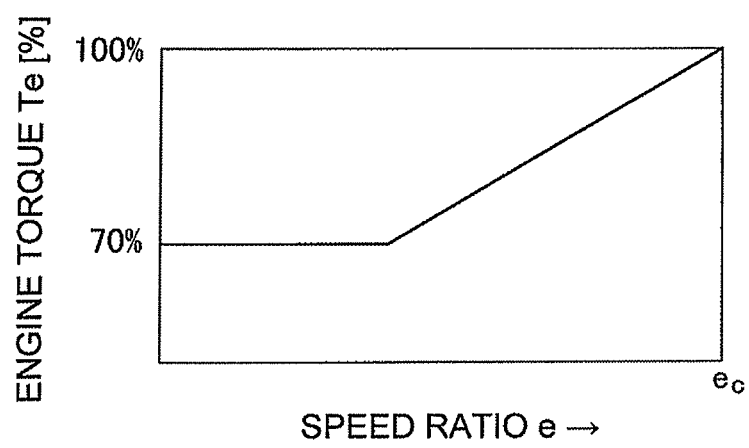
FIG. 6 is a chart for showing a relation between a speed ratio and an engine torque (%).

FIG. 6 shows a relation between the speed ratio e and the torque Te (%) of the engine 3.

In short, when the computed speed ratio e is greater than the speed ratio threshold ec as shown in FIG. 6, the torque line of the engine 3 is maintained to be the maximum torque line Tc100 on which the 100% torque Te can be generated as illustrated in the engine torque line chart of FIG. 3. Accordingly, the 100% torque value can be obtained. On the other hand, when the computed speed ratio e is equal to or less than the speed ratio threshold ec, the torque line of the engine 3 is gradually shifted down from the maximum torque line Tc100 on which the 100% torque Te can be generated to the torque line Tc70 on which the 70% torque Te can be generated as a difference gets larger between the computed speed ratio e and the speed ratio threshold ec. Accordingly, the engine torque Te and the engine output Pe are gradually reduced.

A method of defining the aforementioned speed ratio threshold ec will be hereinafter explained. A bulldozer is assumed as a work vehicle 1 in the present embodiment. A travel device of the crawler type vehicle (e.g., bulldozer) is composed of the crawler belts 5. Therefore, the speed ratio threshold ec can be defined as a speed ratio at which shoe slippage occurs in the crawler belts 5. The term "shoe slippage" herein refers to a slipping state of the crawler belts. For example, the slipping state is caused when a large load acts on a vehicle body in an excavation work by the work implement and the crawler belts accordingly encounter slippage on the ground to spin around.

Furthermore, it is known that the speed ratio e in occurrence of shoe slippage corresponds to a speed ratio at which a traction force F of the work vehicle 1 is 0.8×W (0.8 times of the work vehicle's weight) where weight of the work vehicle 1 is defined as W.

Figure 7:
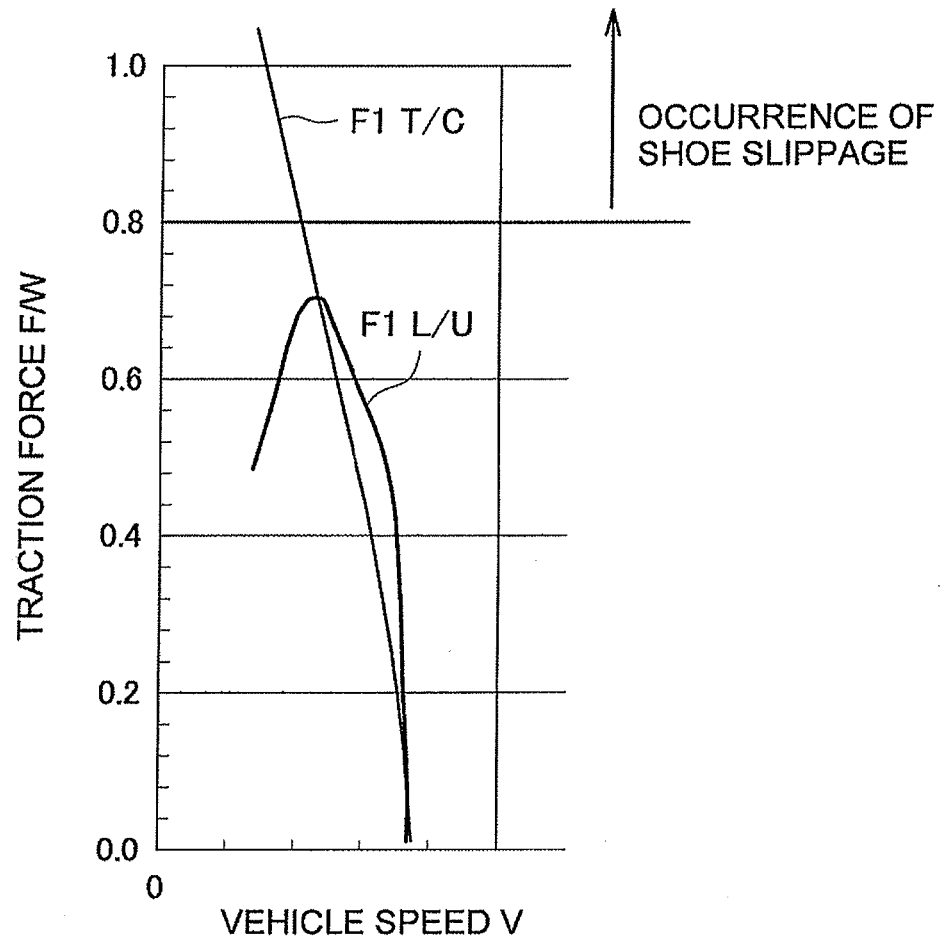
FIG. 7 is a chart for showing a relation between a vehicle speed and a traction force.

FIG. 7 shows a relation between a vehicle speed V and the traction force F. In FIG. 7, "F1 L/U" indicates a characteristic of the traction force F under the condition that the forward clutch F and the speed gear clutch $1^{st}$ (forward first speed: F1) are selectively engaged in the transmission 6 and the lock-up clutch 4a performs an engagement action (lock-up state: L/U). On the other hand, "F1 T/C" indicates a characteristic of the traction force F under the condition that the forward clutch F and the speed gear clutch $1^{st}$ (forward first speed: F1) are selectively engaged in the transmission 6 but the lock-up clutch 4a performs a disengagement action (torque converter state: T/C). Shoe slippage occurs in a vehicle speed range that the forward first speed (F1) lock-up state (L/U) is shifted into the forward first speed (F1) torque converter state (T/C), and at the speed ratio e that the traction force F of the work vehicle 1 is equal to or greater than 0.8×W. Therefore, the speed ratio that the traction force F of the work vehicle 1 equals to 0.8×W can be defined as the speed ratio threshold ec.

Using the following expressions (5) and (6), it is possible to compute the speed ratio e when the traction force F of the work vehicle 1 is 0.8×W and the vehicle speed is within the vehicle speed range that the forward first speed (F1) lock-up state (L/U) is shifted into the forward first speed (F1) torque converter state (T/C), as follows.

The traction force F is expressed with the expression (5).

$$F=2\times 3.14\times T\times R\times K\times 10^3/(L\times Z) \quad (5)$$

The expression indicates that the traction force F is obtained by dividing a product of a transmission input torque T, an entire deceleration ratio R of the power transmission unit 10, and a power transmission efficiency K from the input shaft of the transmission 6 to the sprocket wheels 9 by a product of a link pitch L of the crawler belts 5 and the number of meshing teeth Z of the sprocket wheels 9, and then multiplying this with a coefficient.

On the other hand, the traction force under the condition that shoe slippage occurs in the vehicle 1 is expressed with the expression (6).

$$F=0.8\times W \quad (6)$$

Note that W indicates weight of the vehicle.

When the traction force F in occurrence of shoe slippage is substituted in the expression (5), the transmission input torque T in occurrence of shoe slippage, that is, the output torque Tt of the torque converter 4, can be obtained. The speed ratio e in occurrence of shoe slippage can be obtained based on the output torque Tt, the engine torque Te (equals to the input torque Te of the torque converter), and the torque performance chart of FIG. 2 stored in the controller 20. The torque performance chart of the torque converter 4 is unique to the torque converter 4. Based on the above, the speed ratio e falls in a range of 0.5-0.6. Accordingly, a predetermined value in the range of 0.5-0.6 can be defined as the speed ratio threshold ec.

Next, advantageous effects of the present embodiment will be hereinafter explained.

As illustrated in FIG. 2, a range A is a range that the speed ratio e is equal to or less than "the speed ratio ec at which the torque ratio t of the torque converter 4 is greater than the torque ratio t1 corresponding to the maximum efficiency η max." In the range A, efficiency η of the torque converter 4 is low and the torque ratio t is large. Additionally, the torque converter 4 is in the nearly/completely stalled state in the range A. Therefore, the torque converter efficiency η is reduced and the heat amount of the torque converter 4 is increased. Because of this, a heat balance of the work vehicle 1 is deteriorated and the work vehicle 1 may easily overheat. Furthermore, the torque ratio t is large and the output (torque) of the torque converter 4 is increased in the range A. Therefore, the input torque Tt of the transmission 6 may be increased and excessive torque may be inputted into the transmission 6.

Additionally, when the speed ratio e enters the range A and the torque converter 4 is in the completely stalled state, the crawler belts 5, composing the travel device, completely stop rotating. Accordingly, the output torque Tt of the torque converter 4 cannot be obtained as an effective driving force in the crawler belts 5. In other words, this is a situation that the engine 3 unnecessarily consumes fuel and work efficiency gets worse. Furthermore, when the speed ratio e reaches the range A, shoe slippage may occur in the crawler belts 5. When shoe slippage occurs, the output torque Tt of the torque converter 4 cannot be obtained as an effective driving force in the crawler belts 5. In other words, this is a situation that the engine 3 unnecessarily consumes fuel and work efficiency gets worse.

According to the present embodiment, the output Pe of the engine 3 is reduced when it is determined that the speed ratio e is equal to or less than the speed ratio threshold ec and enters the aforementioned range A. The torque converter 4 gets out of the nearly/completely stalled state, and heat generation of the torque converter 4 is inhibited. Accordingly, proper torque is inputted into the transmission 6, and work efficiency is enhanced. Additionally, there is no chance that shoe slippage occurs in the crawler belts 5. Work efficiency is accordingly enhanced. Furthermore, when the speed ratio e is equal to or less than the speed ratio threshold ec and the output Pe of the engine 3 is reduced, an operator removes a load by operating the work implement 2 for making the torque converter 4 get out of a shoe slippage state or the nearly/completely stalled state. Alternatively, the operator removes a load by reducing the speed Ne of the engine 3 through the regulation of the operating amount (pressed-down amount) of the deceleration pedal 32.

Consequently, the speed ratio e returns to a range B in which the speed ratio e is greater than the speed ratio threshold ec. The torque line Tc of the engine 3 is shifted up to the original 100% torque line Tc100. Accordingly, the vehicle can continue executing a work with the usual engine output.

Note that a control technology, a so-called "shoe slippage control", has been conventionally implemented (see e.g., Japan Laid-open Patent Publications Nos. JP-A-H01-062525, JP-A-H01-178741 and JP-A-H05-106239). The shoe slippage control is a type of control for inhibiting effect of shoe slippage as much as possible by automatically controlling output of the engine when shoe slippage occurs. However, an object of the conventional control technology "shoe slippage control" is to inhibiting effect of shoe slippage as much as possibly only when shoe slippage occurs. Therefore, the shoe slippage control does not solve a problem that occurs when the torque converter is in a nearly/completely stalled state.

In the aforementioned example embodiment, a bulldozer has been assumed and exemplified as a work vehicle 1. However, the present invention can be not only applied to the crawler type vehicle (e.g., bulldozer) but similarly applied to the wheel type work vehicle (e.g., wheel loader) as long as they are provided with a torque converter.

With the illustrated embodiment, it is possible to solve a problem to be caused when a torque converter is in a nearly/completely stalled state. The engine output control system and method according to the illustrated embodiment is useful as an engine output control system of a work vehicle.

The invention claimed is:

1. An engine output control system for a work vehicle composed of an engine, a travel device and a power transmission unit, the power transmission unit including a torque converter and transmitting an output of the engine to the travel device via the torque converter, the engine output control system comprising:
a fuel dial configured to be operated by an operator;
a target engine speed setting portion configured to set a target value of an engine rotational speed of the engine according to an operating amount of the fuel dial;
a speed ratio computation portion configured and arranged to compute a speed ratio of the torque converter;
a determination portion configured and arranged to determine whether the computed speed ratio is equal to or less than a speed ratio threshold set in advance, the speed ratio threshold being smaller than a speed ratio at which a torque ratio of the torque converter corresponds to a maximum efficiency of the torque converter, the speed ratio threshold being a speed ratio equal to and below which the vehicle operates in a state selected from the group consisting of a nearly stalled state and a completely stalled state, the nearly stalled state being when the speed ratio is roughly zero and the completely stalled state being when rotation of an output side of the torque converter is stopped, and above which the vehicle does not operate in a state selected from the group consisting of the nearly stalled state and the completely stalled state;
a storage unit configured and arranged to store data indicative of a relationship between the speed ratio of the torque converter and a plurality of torque lines defining an output torque of the engine with respect to the engine rotational speed, the data including at least a maximum torque line, a middle torque line, and a lowest torque line such that the output torque with respect to the engine rotational speed is largest with the maximum torque line, smaller with the middle torque line than with the maximum torque line, and smaller with the lowest torque line than with the medium torque line; and
an engine output reduction control portion configured and arranged to perform a reduction control of the output torque of the engine when the computed speed ratio is equal to or less than the speed ratio threshold, the engine output reduction control portion being configured to execute the reduction control of the output torque by referring to the data stored in the storage unit and selecting one of the torque lines other than the maximum torque line in accordance with a difference between the computed speed ratio and the speed ratio threshold such that the output torque of the engine is reduced in comparison with the maximum torque line without changing the target value of the engine rotational speed, the selected torque line being shifted downward toward the lowest torque line as the difference between the computed speed ratio and the speed ratio threshold increases, the downward shifting of the selected torque line being executed in stages to discrete torque lines.

2. The engine output control system for a work vehicle according to claim 1, wherein
the travel device of the work vehicle includes crawler belts,
a speed ratio at which a shoe slippage occurs is set in advance as the speed ratio threshold, and
the computed speed ratio being equal to or smaller than the speed ratio threshold is the only condition required for the engine output reduction control portion to execute the reduction control.

3. The engine output control system for a work vehicle according to claim 1, wherein
the speed ratio threshold is set in advance to a speed ratio at which a traction force of the work vehicle equals to 0.8×W where a weight of the work vehicle is defined as W.

4. The engine output control system for a work vehicle according to claim 1, wherein
the speed ratio threshold is set to be in a range of 0.5 to 0.6.

5. The engine output control system for a work vehicle according to claim 1, wherein
the engine output reduction control portion is configured to end the reduction control upon the determination portion determining that the computed speed ratio is larger than the speed ratio threshold.

6. An engine output control method for a work vehicle in which an output of an engine is transmitted to a travel device via a torque converter, the engine output control method comprising:
setting a target value of an engine rotational speed of the engine according to an operating amount of a fuel dial of the work vehicle;
computing a speed ratio of the torque converter;
determining whether the computed speed ratio is equal to or less than a speed ratio threshold set in advance, the speed ratio threshold being smaller than a speed ratio at which a torque ratio of the torque converter corresponds to a maximum efficiency of the torque converter, the speed ratio threshold being a speed ratio equal to and below which the vehicle operates in a state selected from the group consisting of a nearly stalled state and a completely stalled state, the nearly stalled state being when the speed ratio is roughly zero and the completely stalled state being when rotation of an output side of the torque converter is stopped, and above which the vehicle does not operate in a state selected from the group consisting of the nearly stalled state and the completely stalled state;
storing data indicative of a relationship between the speed ratio of the torque converter and a plurality of torque lines defining an output torque of the engine with respect to the engine rotational speed, the data including at least a maximum torque line, a middle torque line, and a lowest torque line such that the output torque with respect to the engine rotational speed is largest with the maximum torque line, smaller with the middle torque line than with the maximum torque line, and smaller with the lowest torque line than with the medium torque line; and
performing a reduction control of the output torque of the engine when the computed speed ratio is equal to or less than the speed ratio threshold, the reduction control of the output torque being executed by referring to the stored data and selecting one of the torque lines other than the maximum torque line in accordance with a difference between the computed speed ratio and the speed ratio threshold such that the output toque of the engine is reduced in comparison with the maximum torque line without changing the target value of the engine rotational speed, the selected torque line being shifted downward toward the lowest torque line as the difference between the computed speed ratio and the speed ratio threshold increases, the downward shifting of the selected torque line being executed in stages to discrete torque lines.

7. The engine output control method for a work vehicle according to claim 6, wherein
the reduction control is ended upon determining that the computed speed ratio is larger than the speed ratio threshold.

8. An engine output control system for a work vehicle composed of an engine, a travel device and a power transmission unit, the power transmission unit including a torque converter and transmitting an output of the engine to the travel device via the torque converter, the engine output control system comprising:
a fuel dial configured to be operated by an operator;
a target engine speed setting portion configured to set a target value of an engine rotational speed of the engine according to an operating amount of the fuel dial;
a speed ratio computation portion configured and arranged to compute a speed ratio of the torque converter;
a determination portion configured and arranged to determine whether the computed speed ratio is equal to or less than a speed ratio threshold set in advance, the speed ratio threshold being smaller than a speed ratio at which a torque ratio of the torque converter corresponds to a maximum efficiency of the torque converter, the speed ratio threshold being a speed ratio equal to and below which the vehicle operates in a state selected from the group consisting of a nearly stalled state and a completely stalled state, the nearly stalled state being when the speed ratio is roughly zero and the completely stalled state being when rotation of an output side of the torque converter is stopped, and above which the vehicle does not operate in a state selected from the group consisting of the nearly stalled state and the completely stalled state;
a storage unit configured and arranged to store data indicative of a relationship between the speed ratio of the torque converter and a plurality of torque lines defining an output torque of the engine with respect to the engine rotational speed, the data including at least a maximum torque line and a lowest torque line such that the output torque with respect to the engine rotational speed is largest with the maximum torque line and smallest with the lowest torque line; and
an engine output reduction control portion configured and arranged to perform a reduction control of the output torque of the engine without changing the target value of the engine rotational speed upon the computed speed ratio being equal to or less than the speed ratio threshold, the engine output reduction control portion being configured to execute the reduction control of the output torque by referring to the data stored in the storage unit and reducing the output torque of the engine to a value equal to or smaller than an output torque according to the target value of the engine rotational speed and the maximum torque line and larger than or equal to an output torque according to the target value of the engine rotational speed and the lowest torque line, the output torque of the engine being reduced in a continuous manner according to a difference between the computed speed ratio and the speed ratio threshold such the output torque becomes smaller as the difference the computed speed ratio and the speed ratio threshold becomes larger.

9. The engine output control system for a work vehicle according to claim 8, wherein
the engine output reduction control portion is configured to end the reduction control upon the determination portion determining that the computed speed ratio is larger than the speed ratio threshold.

10. An engine output control method for a work vehicle in which an output of an engine is transmitted to a travel device via a torque converter, the engine output control method comprising:
setting a target value of an engine rotational speed of the engine according to an operating amount of a fuel dial of the work vehicle;
computing a speed ratio of the torque converter;
determining whether the computed speed ratio is equal to or less than a speed ratio threshold set in advance, the speed ratio threshold being smaller than a speed ratio at which a torque ratio of the torque converter corresponds to a maximum efficiency of the torque converter, the speed ratio threshold being a speed ratio equal to and below which the vehicle operates in a state selected from the group consisting of a nearly stalled state and a completely stalled state, the nearly stalled state being when the speed ratio is roughly zero and the completely stalled state being when rotation of an output side of the torque converter is stopped, and above which the vehicle does not operate in a state selected from the group consisting of the nearly stalled state and the completely stalled state;
storing data indicative of a relationship between the speed ratio of the torque converter and a plurality of torque lines defining an output torque of the engine with respect to the engine rotational speed, the data including at least a maximum torque line, a middle torque line, and a lowest torque line such that the output torque with respect to the engine rotational speed is largest with the maximum torque line, smaller with the middle torque line than with the maximum torque line, and smaller with the lowest torque line than with the medium torque line; and
performing a reduction control of the output torque of the engine when the computed speed ratio is equal to or less than the speed ratio threshold, the reduction control of the output torque being executed by referring to the stored data and selecting one of the torque lines other than the maximum torque line in accordance with a difference between the computed speed ratio and the speed ratio threshold such that the output toque of the engine is reduced in comparison with the maximum torque line without changing the target value of the engine rotational speed, the selected torque line being shifted downward toward the lowest torque line as the difference between the computed speed ratio and the speed ratio threshold increases, the downward shifting of the selected torque line being executed in a continuous fashion.

11. The engine output control method for a work vehicle according to claim 10, wherein
the reduction control is ended upon determining that the computed speed ratio is larger than the speed ratio threshold.

* * * * *